United States Patent [19]

Burlett et al.

[11] Patent Number: 5,118,545
[45] Date of Patent: Jun. 2, 1992

[54] ADHESION OF ARAMID CORD TO RUBBER

[75] Inventors: Donald J. Burlett, Wadsworth; Richard G. Bauer, Kent, both of Ohio

[73] Assignee: The Goodyear Tire & Rubber Company, Akron, Ohio

[21] Appl. No.: 489,147

[22] Filed: Mar. 5, 1990

[51] Int. Cl.⁵ .................. B29B 22/00; B29B 23/22; B32B 1/08; B32B 27/34
[52] U.S. Cl. ................... 428/36.1; 428/36.3; 428/287; 428/288; 428/290; 428/292; 428/293; 428/295; 428/565; 152/565; 156/331.1; 156/334; 156/910; 525/90
[58] Field of Search ............ 525/90; 156/334, 910, 156/331.1; 428/476.1, 476.3, 476.9, 36.1, 36.3, 287, 288, 290, 295; 152/365

[56] References Cited

U.S. PATENT DOCUMENTS

| | | | |
|---|---|---|---|
| 3,853,796 | 12/1974 | Oldack et al. | 525/90 |
| 3,888,805 | 6/1975 | van Gils et al. | 156/910 |
| 3,906,057 | 9/1975 | Durst | 525/99 |
| 3,951,887 | 4/1976 | Tanimura et al. | 156/334 |
| 3,956,566 | 5/1976 | van Gils et al. | 428/476.3 |
| 3,969,568 | 7/1976 | Sperley | 428/476.3 |
| 4,048,362 | 9/1977 | Moring et al. | 428/476.1 |
| 4,090,996 | 5/1978 | Gergen et al. | 525/92 |
| 4,204,984 | 5/1980 | Neubert | 156/910 |
| 4,259,404 | 3/1981 | van Gils | 428/476.3 |
| 4,285,756 | 8/1981 | Elmer | 156/910 |
| 4,300,615 | 11/1981 | Kavchok | 156/910 |
| 4,300,972 | 11/1981 | Neubert | 156/910 |
| 4,328,324 | 5/1982 | Kock et al. | 156/910 |
| 4,448,813 | 5/1984 | Solomon | 524/521 |
| 4,472,463 | 9/1984 | Solomon | 525/218 |
| 4,569,963 | 2/1986 | Hisaki et al. | 156/910 |

OTHER PUBLICATIONS

Polymer Alloys and Blends, Thermodynamics and Rheology, Leszek A. Utracki, Hanser Publications, 1989, pp. 21-23 and 124-129.
S. Ogata et al., Macromolecules, 18, pp. 851-855 (1985).
Y. Imai et al., Polymer Journal, 17 (11), pp. 1173-1178 (1985).
S. Ogata et al., Polymer Journal, vol. 17, No. 8, pp. 935-941 (1985).
K. H. Nordsiek, Paper Presented at "IRC 86" Goteborg, Sweden Fegade et al., Rubber India, Jan. pp. 19-24 (1985).
Hepburn et al., Int. J. Adhesion and Adhesives, vol. 5, No. 3, Jul., pp. 153-159.
Y. Wu et al., J. Applied Poly Sci., vol. 31, pp. 1041-1059 (1986).
E. H. Burstall et al., J. Chem. Soc., 3570-3579 (1952).
M. Kajiyama et al., Polymer Journal, vol. 18, No. 10, pp. 735-740 (1986).
H. B. Ozgun et al., European Polymer Journal vol. 22, No. 12, pp. 1009-1014, (1986).
R. Martin et al., Die Angewandte Makromolekulare Chemie, 132, pp. 91-108 (1985).
R. Martin et al., Die Angewandte Makromolekulare Chemie, 133, pp. 121-140 (1985).

*Primary Examiner*—Ana L. Carrillo
*Attorney, Agent, or Firm*—Bruce J. Hendricks

[57] ABSTRACT

The present invention relates to a method of improving the adhesion between an aramid cord and sulfur vulcanized rubber comprising (a) treating the aramid cord with a copolymer of the structural formula:

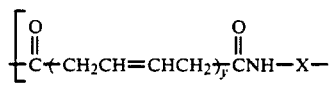

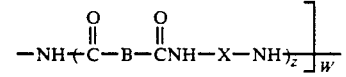

wherein w is an integer of from 1 to 100, y is an integer of from 10 to 500; z is an integer of from 1 to 120; X is:

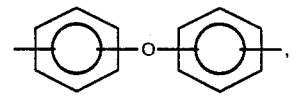

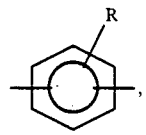

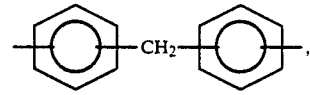

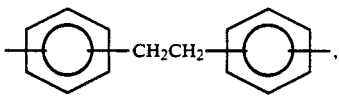

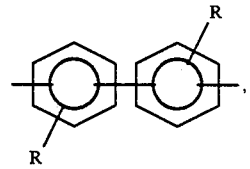

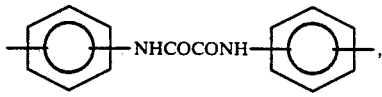

or mixtures thereof; B is:

(Abstract continued on next page.)

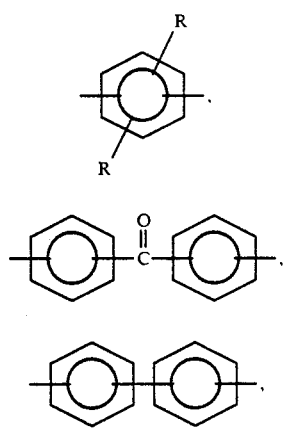
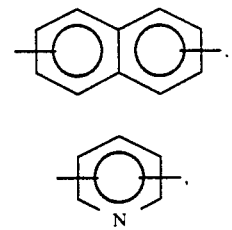
or mixtures thereof; wherein R is selected from the group consisting of H, Cl or CH$_3$; and
(b) vulcanizing a composite of the treated cord and rubber.
17 Claims, No Drawings

ADHESION OF ARAMID CORD TO RUBBER

BACKGROUND OF THE INVENTION

The present invention relates to a method of improving adhesion between an aramid cord and sulfur vulcanized rubber. Aramid cords have higher tensile strengths than polyester and nylon cords having the same denier. Accordingly in those applications when the rubber composite will be subjected to severe stress and strain, use of aramid cords are preferred over polyester and nylon cords. Whereas use of the aramid cord is preferred, one must still deal with the interface between the cord and rubber, which is a particular problem in those applications involving severe stress and strain. Conventional methods of promoting adhesion between aramid cords and vulcanized rubber include a diurethane curing system and a resorcinol-formaldehyde resin formed in-situ with silica as the co-agent. Whereas, these methods have met with limited success, there is a continuing desire to further improve the adhesion between an aramid cord and its rubber environment in a composite.

SUMMARY OF THE INVENTION

The present invention relates to improving the adhesion of an aramid cord to sulfur vulcanized rubber by treating the aramid cord with an aramid-polydiene copolymer and vulcanizing a composite of the treated cord and rubber.

DETAILED DESCRIPTION OF THE INVENTION

There is disclosed a method of improving the adhesion between an aramid cord and sulfur vulcanized rubber comprising (a) treating the aramid cord with a copolymer of the structural formula:

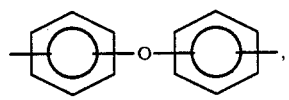

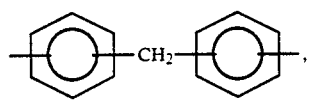

wherein w is an integer of from 1 to 100, y is an integer of from 10 to 500; z is an integer of from 1 to 120; X is:

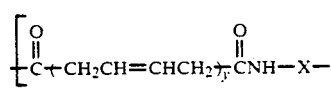

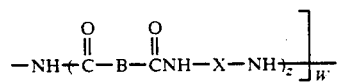

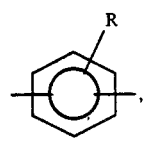

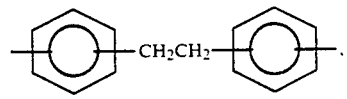

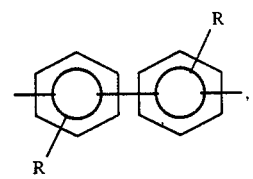

or mixtures thereof; B is:

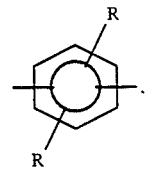

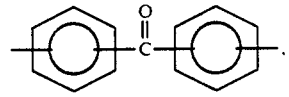

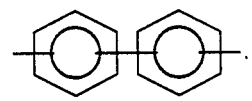

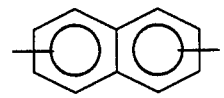

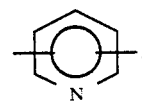

or mixtures thereof; and wherein R is selected from the group consisting of H, Cl or CH₃; and (b) vulcanizing a composite of the treated cord and rubber.

In addition, there is disclosed a reinforced vulcanizate comprising:

(a) a sulfur vulcanized rubber and (b) an aramid cord treated prior to the vulcanization of the rubber with

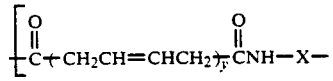

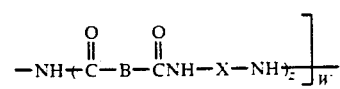

wherein w is an integer of from 1 to 100, y is an integer of from 10 to 500; z is an integer of from 1 to 120; X is:

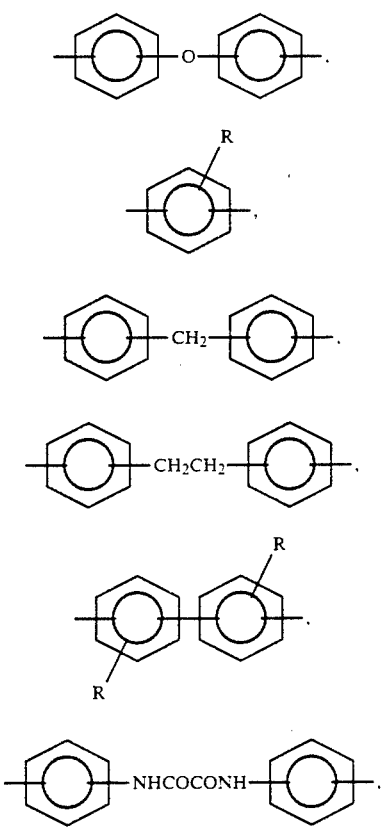

or mixtures thereof; B is:

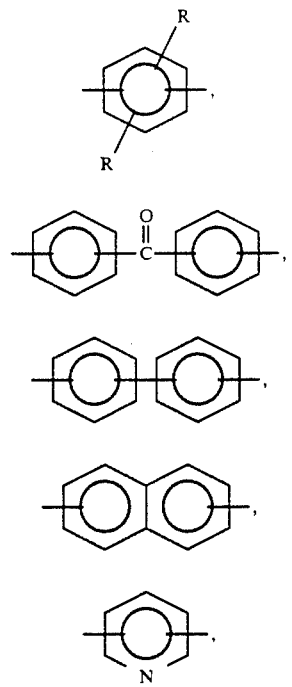

or mixtures thereof; and wherein R is selected from the group consisting of H, Cl or CH$_3$.

With respect to the above formula for the aramid-polydiene copolymer, w is preferably an integer of from 1 to 25; y is preferably an integer of from 70 to 90; z is preferably an integer of from 4 to 100; X is:

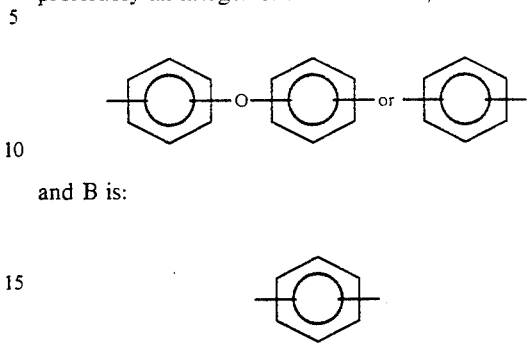

and B is:

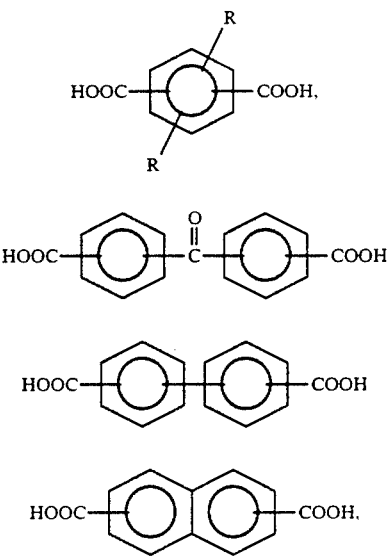

The aramid-polydiene copolymers for use in the present invention may have a wide range of molecular weights. Generally speaking, the number average molecular weight may range from about 1,000 to about 1,000,000. Preferably, the number average molecular weight ranges from about 10,000 to about 100,000. Specific examples of these aramid-polydiene copolymers are described in Ogata et al, Macromolecules, 18, 851 (1985): Ogata et al, Polymer Journal, 17(11) 1173 (1985) and Ogata et al, Polymer Journal, 17, (8), 935 (1985).

The aramid-polydiene copolymers for use in the present invention are prepared by the direct polycondensation of liquid α, ω-polybutadienedicarboxylic acid and an amine-terminated aramid oligomer. The α, ω-polybutadienedicarboxylic acid (LPB-diacid) that is commercially available from The B. F. Goodrich Company under the designation Hycar CPB may be used to prepare the multiblock copolymers. These LPB-diacids generally have a number average molecular weight ranging from about 4800 to about 5200. The amine-terminated aramid oligomer is derived from the polycondensation reaction between (a) an aromatic dicarboxylic acid and (b) an aromatic diamine. Examples of aromatic dicarboxylic acids which may be used to prepare the amine terminated oligomer include those of the formula:

-continued

or mixtures thereof. The preferred aromatic dicarboxylic acid or chloride thereof is terephthalic acid and terephthaloyl chloride. Specific examples of aromatic diamines which may be used to prepare the amine terminated oligomer include:

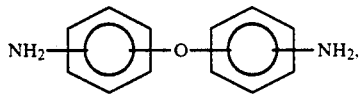

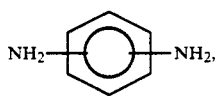

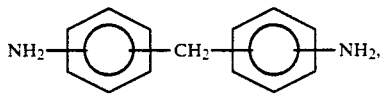

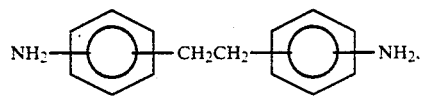

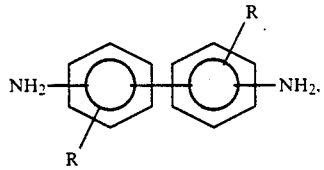

or mixtures thereof and wherein R is H, Cl or CH$_3$. Of the above, preferably the aromatic diamine is 3,4'-oxydianiline, 4,4'-oxydianiline, 1,4-p-phenylene-diamine, 1,3-o-phenylenediamine or mixtures thereof. The amine-terminated aramid oligomer may be prepared by the polycondensation reaction between an aromatic dicarboxylic acid or chloride thereof and a stoichiometric excess of the aromatic amine in the presence of a condensing agent. So long as there is a molar excess, the molar ratio of the aromatic amine to the aromatic dicarboxylic acid or chloride thereof may vary. Generally speaking, the molar ratio of the aromatic amine to aromatic dicarboxylic acid ranges from about 1.01 to about 1.75 with a range of from about 1.01 to about 1.05 being preferred. The number average molecular weight of the amine-terminated oligomer may vary depending on the molar ratio of the reactants, duration of the reaction and the like. Generally speaking, the number average molecular weight of the amine-terminated oligomers range from about 900 to 5100.

The relative weight percentages of the aramid blocks and the polybutadiene blocks in the multiblock copolymer may vary. For example, the multiblock copolymer may contain from about 10 to about 90 weight percent of the aramid block, with the balance of the multiblock copolymer being the polybutadiene block. If the weight percent of the aramid block is above 50 weight percent, preparation of the multiblock copolymer becomes more difficult due to formation of free aramid (non-block). On the other hand, if the weight percent of the aramid block is below 10 weight percent, larger amounts of the multiblock copolymer are needed to introduce the same level of aramid block. Preferably, the weight percent of the aramid block ranges from about 10 to about 50, with the polybutadiene blocks ranging from about 90 to about 50 weight percent of the multiblock copolymer. A particularly preferred multiblock copolymer is when the weight percent of an aramid block ranges from about 20 to about 30 with the polybutadiene block ranging from about 80 to about 70 weight percent.

The present invention is used to improve the adhesion of aramid cord to rubber. Aramid is used herein to describe an aromatic polyamide. Aromatic polyamides are composed substantially of aromatic polyamide structures prepared by reacting an aromatic dicarboxylic acid and an aromatic diamine, such as terephthalic acid or anhydride and p-phenylene diamine. Alternatively, the aromatic polyamide may be an aromatic aminocarboxylic acid, such as, for example 4-aminobenzoic acid. A specific example of a preferred aramid cord is marketed by E I Du Pont de Nemour & Company, Inc, under the trademark Kevlar TM.

Aramid cord is used herein to describe a monofilament or 2 or more filaments wound together. The present invention is not limited by the denier of the cord and accordingly conventional deniers may be used as known to those skilled in the art. Conventionally, cords having a denier ranging from about 1000 to 1500 to 3000 may be used having varying strengths. For example, in hose applications, a tenacity of from 12 grams per denier to 25 grams per denier may be used. For applications in tires, a tenacity of from about 19 to about 20 grams per denier may be used. Tenacity of the cord is determined by dividing the breaking strength of the filament in grams by the denier of the filament.

The manner in which the polyamide-polydiene copolymer is placed onto the surface of the aramid cord may vary. The cord may be coated by applying a solution of the aramid-polydiene copolymer to the cord and evaporating the solvent or suspending medium. For example, the cord may be dipped into a solution of the polyamide-polydiene copolymer and dried by a blast of hot air. The solution may also be applied by wipes, pads, spraying and the like. Preferably, the cord is immersed in a bath. The immersion time of the cord may vary depending on the amount of coating one desires apply. Generally, the time of immersion ranges from about 2 to 20 seconds. Preferably the time of immersion is from about 5 to about 10 seconds.

The polyamide-polydiene copolymer may be dissolved in a solution. The solvent should have the characteristic of being able to dissolve the polyamide-polydiene copolymer. Examples of solvents include pyridine, tetrahydrofuran, n-methyl pyrrolidone, dimethyl formamide, dimethyl acetamide. The polyamide-polydiene may be added to the medium or agent used to lubricate the cord during the final drawing process. However, care must be exercised to use a lubricant that is compatible with the polyamide-polydiene copolymer, i.e., the lubricant must retain its lubricating properties and not decompose upon addition of the polyamide-polydiene copolymer. Naturally any combination of these methods may be used. Obviously, depending on the particular solvent, the amount of polyamide-polydiene copolymer may vary. Generally speaking, the concentration of polyamide-polydiene copolymer in the solvent may range from about 0.25 weight percent to about 3 weight percent of the total weight of the solution. Preferably the weight percent ranges from about 0.5 to about 1.5 weight percent.

The temperature of the polyamide-polydiene copolymer solution may vary and range from a temperature of from ambient to about 50° C. Preferably, the temperature ranges from about 25° to 35° C.

Following the application of the polyamide-polydiene copolymer, the cord may be contacted with wipes. Use of wipes assist in controlling the amount of residue solution remaining and the polyamide-polydiene coating weight.

After the polyamide-polydiene has been applied to the cord, the treated cord may be reused to remove any excess polyamide-polydiene coating. The treated cord may be rinsed by immersion in a bath or by a water spray. In some instances, an exposure time to the rinse solution of from about 1 to 5 seconds may be used. In other instances, a rinse is not necessary if, for example, an efficient solution wipe is used and adequate drying is utilized.

As known to those skilled in the art, the rinsed cord may be contacted with a wipe to avoid excessive rinse solution from being conveyed with the treated cord.

After the treated cord has been treated, and rinsed if necessary, the cord is dried by methods known to those skilled in the art. Examples of such methods include wipes, pressurized hot air and vacuum drying. The temperature of the hot air may vary from near ambient to above 400° C. The treated cord should be sufficiently dried prior to take-up of the treated cord. Preferably the hot air dryer is at a temperature from about 100° to 300° C. depending on the residence time in the dryer. Typical times are 3 to 10 seconds.

Upon winding, the treated cord may be fine drawn in a manner known to those skilled in the art and converted to a multifilament cord if it was a single filament during treatment for use in a rubber vulcanizate composite.

The treated cord may be utilized in combination with a sulfur vulcanized rubber to form a rubber vulcanizate composite. The rubber surrounding the treated cord can be any rubber, preferably rubbery materials having available unsaturation such as natural and synthetic vulcanizable rubbers and rubbery polymers of dienes preferably of open chain conjugated dienes having 4 to 8 carbon atoms. Specific examples of rubbery materials which may be utilized in combination with the treated cords are natural rubber, polybutadiene-1,3, polyisoprene, poly-2,3-dimethyl-butadiene-1,3, poly-2-chlorobutadiene-1,3 and the like. Other synthetic rubbers include those obtained from 1,3-dienes by copolymerization with each other or with at least one copolymerizable monomer such as isobutylene, styrene, acrylonitrile, methyl methacrylate, 4-vinyl pyridine and the like. The polymeric diene rubbers generally contain at least 50% by weight of the diene and preferably contain from about 55–85% by weight of the diene. However, copolymers, terpolymers and the other multi-component polymers containing as little as 35% or less by weight of dienes may also be employed. Additional rubbery materials that may be used in combination with the treated cord are unsaturated and polymers containing acid groups obtained by the copolymerization of a major amount of a conjugated diene with an olefinically unsaturated carboxylic acid. Still other rubbers include those formed by the copolymerization of dienes with alkyl acrylates and by the polymerization of an alkyl acrylate with at least one other unsaturated monomer followed by hydrolysis. Rubbery polyester urethanes, polyether urethanes and polyester amide urethanes having curable double bonds or available unsaturation and rubber reclaimed from the foregoing may also be used. Mixtures of two or more of the foregoing rubbers may be employed as ingredients in the vulcanizates formed with the treated cord. The preferred rubbers are the natural and synthetic polyisoprenes, the polybutadienes, the polychloroprenes, the copolymers of isobutylene with isoprene, copolymers of butadiene-1,3 with styrene, and copolymers of butadiene-1,3 with acrylonitrile.

The treated cord is used with conventional rubber stocks and any particular type of stock is not viewed as an aspect of the present invention. In addition to the above rubbers, conventional rubber stocks may contain carbon black, silica, zinc oxide, tackifiers, methylene donors and acceptors, peptizing agents, oils, waxes, antioxidants, antiozonants, accelerators and retarders. The relative amount of each conventional additive will vary depending on the particular application of the stock, i.e. in a hose, tire, belt and more specifically carcass, chafer, tread, etc.

The vulcanization of the rubber is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur.

The treated cord is used in combination with conventional rubber stocks to form composites, for example, in hoses belts and tires. These combinations are known to those skilled in the art and are not limited by use of the present invention.

After the rubber stock has been combined with the treated cord to form a pre-vulcanizate, vulcanization is generally carried out at temperatures of between about 100° C. and 200° C. Preferably the vulcanization is conducted at temperatures ranging from about 110° C. to 180° C. Any of the conventional vulcanization processes may be used such as heating in a press or mold, heating with steam or hot air or in a salt bath.

Various reinforced vulcanizates may be made with use of aramid cords prepared by the process of the present invention. For example, tires, belts and hoses may be made. The preferred reinforced vulcanizate is a tire.

The present invention is further illustrated by the reference to the following examples which are intended to be representative and not restrictive of the scope of the present invention. Unless otherwise indicated, all parts and percentages are by weight.

The aramid cords used in the following examples were purchased from E I Du Pont under the trademark Kevlar ™. The cord had a denier of 3000/3 and was unfinished.

EXAMPLE 1

Preparation of Polyamide-Polydiene Copolymer Having 80 Percent by Weight Polybutadiene Units and 20 Percent by Weight Aramid Units In a 500 ml round bottom reaction flask equipped with a stirrer, thermometer, condenser and nitrogen purge, was placed 0.64 grams (0.0059 moles) of 1,4-p-phenylenediamine, 0.79 grams (0.004 moles) of terephthalic acid, 0.50 grams (0.118 moles) of lithium chloride, 1.50 grams of calcium chloride, 100 milliliters of pyridine, 400 milliliters of N-methyl pyrrolidone and 5.0 grams of Hycar CPB (4200 molecular weight). The reaction flask was purged with nitrogen and 3.33 grams of triphenyl phosphite was added. The reaction mixture was heated with stirring at 90°-100° C. for 6½ hours. The suspension was then cooled to room temperature and used as produced.

EXAMPLE 2

Preparation of Polyamide-Polydiene Copolymers Having 75 Percent by Weight Polybutadiene Units and 25 Percent by Weight Aramid Units In a 500 ml round bottom reaction flask equipped with a stirrer, thermometer, condenser and nitrogen purge was placed 0.85 grams (0.00786 moles) of 1,4-p-phenylenediamine, 1.30 grams (0.00786 moles) of isophthalic acid, 0.50 grams (0.118 moles) of lithium chloride, 1.50 grams of calcium chloride, 100 ml of pyridine, 40 ml of n-methylpyrrolidone, and 5.0 grams (0.00119 moles) of Hycar CPB (4200 molecular weight). The mixture was stirred and 4.88 grams of triphenylphosphite were added. The mixture was stirred for approximately 18 hours at a temperature of 90°-100° C. The solution was cooled and used as produced.

EXAMPLE 3

Preparation of Aramid-Polydiene Copolymer Having 65 Weight Percent by Weight Polybutadiene Units and 35 Percent by Weight Aramid Units (9328-16)

In a 500 ml round bottom reaction flask equipped with a stirrer, thermometer, condenser and nitrogen purge, was placed 5.0 grams (0.00119 moles) of Hycar CPB, 1.30 grams 0.00736 moles) of isophthalic acid, 1.56 grams (0.00786 moles) of 4-aminophenyl ether, 0.50 grams (0.118 moles) of lithium chloride, 1.50 grams of calcium chloride and 400 milliliters of N-methylpyrrolidone. The mixture was stirred and then 4.88 grams of triphenylphosphite and 100 milliliters of pyridine were added. The mixture was stirred for approximately 21 hours at a temperature of 90°-100° C. The mixture was cooled and coagulated by slowly adding the solution to 2.5 liters of methanol containing 5 percent by weight of a phenolic antioxidant. The methanol slurry was stirred for 1-2 hours after which the product was collected by filtration and washed with methanol. The solid product was dried at 60°-70° C. for 8 hours, isolated and added to 800 ml of THF with 0.5 weight percent butylated hydroxy toluene. The mixture was stirred and filtered through celite to remove insoluble material. This yielded a solution with 0.64 weight percent copolymer.

EXAMPLE 4

The solution of Example 3 (0.64% solids) was used to dip a number of 34 3 cm lengths of Kevlar cord (3000/3). Each sample was weighed, dipped at room temperature with a dip time of about 10 seconds, and dried in a vacuum oven at 60°-70° C. For the purpose of comparison, eight samples were not dipped but were oven treated for 1 hour at 140° C. in a vacuum oven.

| Sample | DIP | Tare Weight (g) | Treated Cord Weight (g) |
|---|---|---|---|
| 1 | No | .384 | .372 |
| 2 | No | .385 | .378 |
| 3 | No | .388 | .378 |
| 4 | No | .388 | .375 |
| 5 | No | .389 | .381 |
| 6 | No | .392 | .381 |
| 7 | No | .395 | .385 |
| 8 | Yes | .370 | .371 |
| 9 | Yes | .373 | .371 |
| 10 | Yes | .375 | .376 |
| 11 | Yes | .376 | .377 |
| 12 | Yes | .376 | .376 |
|  | Yes | .377 | .375 |
| 13 | Yes | .378 | .378 |
| 14 | Yes | .379 | .380 |
| 15 | Yes | .379 | .377 |
| 16 | Yes | .380 | .377 |
| 17 | Yes | .380 | .381 |
| 18 | Yes | .386 | .383 |

This data refers to the amount of copolymer applied to the cords during dipping in a THK solution of copolymer (Example 3). The undipped and dried samples show a weight loss of about 2.5 percent, presumably from moisture driven off during drying. The dipped cords show, on average, no weight gain. Based on this data, it is presumed that the 2.5 percent weight loss from moisture is balanced by addition of 2.5 percent weight of copolymer to the cord surface from dipping.

EXAMPLE 5

Finish-free Kevlar cord (3000/3) was cut into 34.3 cm lengths. Each sample was weighed, dipped in various solutions, dried and tested for pull out force. Each sample was dipped for 10 seconds in the solution at room temperature. The samples were dried by vacuum oven at 60°-70° C. for 1 hour in the THF solutions and 140° C. for 1 hour for the pyridine/NMP solution.

The test for measuring the pull out force consisted of placing the dried, dipped cords between sheets of the stock to be tested in, such that the ends of the cords protrude from the ends of the test stock sheets. The two sheets are knitted together by application of pressure and the cords are then cut by razor edge a set distance from the edge of the sheets. The sheets are then press cured to t90 and 2×t90 (best cure and double best cure). Once cured the cords are then clamped in specific jaws of an Instron tensile tester and pulled apart until the cord is pulled from the rubber. The recorded force necessary to remove the cord from the cured sheet is recorded.

| Solution Example | Dip Form | Pull Out Force | |
|---|---|---|---|
| | | Best Cure | Double Best Cure |
| None | None | 138 | 146 |
| 1 | Suspension | 113 | 124 |
| 2 | Solution | 150 | 164 |
| 2 | Solution | 151[1] | 165[1] |
| 3 | Solution | 145 | 157 |

[1] Dipped three times with one hour vacuum dry after each dip.

When the pull out force for the cord treated with the copolymer suspension (Example 1) is compared to untreated cord, it is obvious that no improvement in adhesion is provided. Actually, the suspension treatment results in a drop in cord adhesion.

Treatment by dipping the cords into solutions of the copolymers resulted in improvements in cord adhesion of about 10–15 percent. Also, multiple dips of the cord do not provide any advantage over single dips.

Data at double best cure (2×t90) compared to best cure (t90) show that additional curing of the stock leads to improved adhesion. This indicates improved adhesion with aging of the stocks.

What is claimed is:

1. A reinforced vulcanizate comprising:
   (a) a sulfur vulcanized rubber; and
   (b) an aramid cord treated prior to vulcanization of the rubber with a solution of a copolymer, wherein said solution comprises from about 0.5 to about 1.5 weight percent of said copolymer and from about 98.5 to about 99.5 weight percent of a solvent selected from the group consisting of pyridine, tetrahydrofuran, methyl pyrrolidone, dimethyl foramide and dimethyl acetamide and said copolymer is of the structural formula:

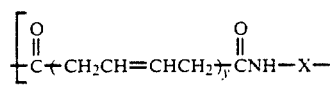

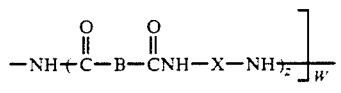

wherein w is an integer of from 1 to 100, y is an integer of from 10 to 500; z is an integer of from 1 to 120; X is:

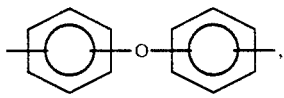

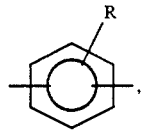

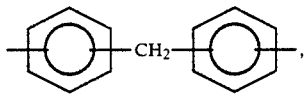

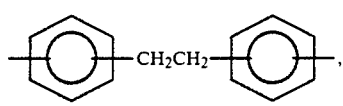

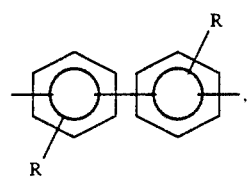

or mixtures thereof; B is:

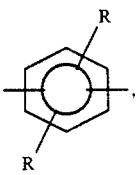

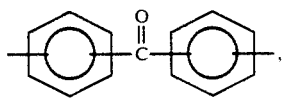

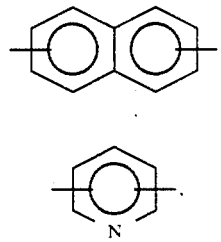

or mixtures thereof wherein R is selected from the group consisting of H, Cl and $CH_3$.

2. The reinforced vulcanizate of claim 1, wherein w is an integer of from 1 to 25; y is an integer of from 70 to 90; and z is an integer of from 4 to 100.

3. The reinforced vulcanizate of claim 1 wherein X is:

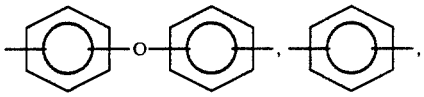

or mixtures thereof.

4. The reinforced vulcanizate of claim 1 wherein B is

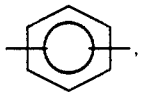

5. The reinforced vulcanizate of claim 1 wherein said multiblock copolymer is of the structural formula:

$$\left[ \begin{array}{c} O \\ \| \\ C\end{array}\!\!-\!\!(CH_2CH\!=\!CHCH_2)_{\overline{y}}\!\!-\!\!\begin{array}{c}O\\ \|\\ C\end{array}\!\!NH\!\!-\!\!\!\bigcirc\!\!\!-\!\!NH\!\!-\!\!\!\begin{array}{c}O\\ \|\\ C\end{array}\!\!-\!\!\!\bigcirc\!\!\!-\!\!\begin{array}{c}O\\ \|\\ C\end{array}\!\!NH\!\!-\!\!\!\bigcirc\!\!\!-\!\!NH\!\!-\!\!\right]_{w'}$$

6. The reinforced vulcanizate of claim 1 wherein said elastomer is natural rubber, synthetic rubber or mixture thereof.

7. The reinforced vulcanizate of claim 6 wherein said elastomer is synthetic and is selected from the group consisting of polybutadiene, polyisoprene, styrene-/butadiene copolymers, EPDM, polychloroprene, terpolymers of acrylonitrile butadiene and styrene and blends thereof.

8. The reinforced vulcanizate of claim 1 wherein said vulcanizate is a tire, belt or hose.

9. The reinforced vulcanizate of claim 7 wherein said vulcanizate is a tire.

10. A method of improving the adhesion between an aramid cord and sulfur vulcanized rubber comprising (a) treating the aramid cord with a solution of a copolymer, wherein said solution comprises form about 0.5 to about 1.5 weight percent of said copolymer and from about 98.5 to about 99.5 weight percent of a solvent selected from the group consisting of pyridine, tetrahydrofuran, methyl pyrrolidone, dimethyl foramide and dimethyl acetamide and said copolymer is of the structural formula:

$$\left[ \begin{array}{c}O\\ \|\\ C\end{array}\!\!-\!\!(CH_2CH\!=\!CHCH_2)_{\overline{y}}\!\!-\!\!\begin{array}{c}O\\ \|\\ C\end{array}\!\!NH\!\!-\!\!X\!\!-\right.$$
$$\left.-NH\!\!-\!\!\begin{array}{c}O\\ \|\\ C\end{array}\!\!-\!\!B\!\!-\!\!\begin{array}{c}O\\ \|\\ C\end{array}\!\!NH\!\!-\!\!X\!\!-\!\!NH\right]_{\overline{w'}}$$

wherein w is an integer of from 1 to 100; y is an integer of from 10 to 500; z is an integer of from 1 to 120; X is:

—⟨○⟩—O—⟨○⟩—,

—⟨○⟩^R—,

—⟨○⟩—CH₂—⟨○⟩—,

—⟨○⟩—CH₂CH₂—⟨○⟩—,

-continued

—⟨○⟩^R—⟨○⟩_R—,

—⟨○⟩—NHCOCONH—⟨○⟩—, or mixtures thereof; B is:

—⟨○⟩^R_R—,

—⟨○⟩—C(=O)—⟨○⟩—,

—⟨○⟩—⟨○⟩—,

—⟨○○⟩—  (naphthalene),

—⟨○⟩_N—, or mixtures thereof wherein R is selected from the group consisting of H, Cl and CH₃; and (b) vulcanizing a composite of the treated cord and rubber.

11. The method of claim 10 wherein B is

12. The method of claim 10 wherein w is an integer of from 1 to 25; y is an integer of from 70 to 90; z is an integer of from 4 to 100.

13. The method of claim 10 wherein X is:

—⟨○⟩—O—⟨○⟩—, ⟨○⟩, or mixtures thereof.

14. The method of claim 10 wherein said multiblock copolymer is of the structural formula:

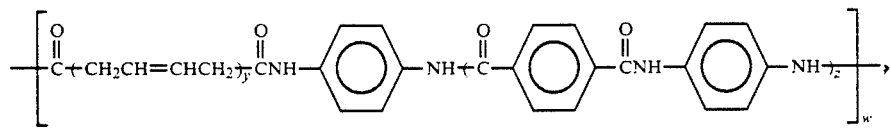

15. The method of claim 10 wherein said rubber is selected from the group consisting of natural rubber, synthetic rubber or mixture thereof.

16. The method of claim 15 wherein said rubber is synthetic and is selected from the group consisting of polybutadiene, polyisoprene, styrene/butadiene copolymers, EPDM, polychloroprene, terpolymers of acrylonitrile butadiene and styrene and blends thereof.

17. The method of claim 10 wherein the aramid cord has a denier of from about 1000 to about 3000.

* * * * *